(12) United States Patent
Shigyo

(10) Patent No.: US 7,305,673 B2
(45) Date of Patent: Dec. 4, 2007

(54) COUNT SYSTEM FOR A NUMBER OF PERIPHERAL DEVICES AND FOR A USER-NUMBER OF SOFTWARE, AND ROYALTY SETTLING SYSTEM

(75) Inventor: Yuji Shigyo, Saitama (JP)

(73) Assignee: Fujifilm Corporation, Tokyo (JP)

( * ) Notice: Subject to any disclaimer, the term of this patent is extended or adjusted under 35 U.S.C. 154(b) by 396 days.

(21) Appl. No.: 10/160,044

(22) Filed: Jun. 4, 2002

(65) Prior Publication Data

US 2002/0188660 A1   Dec. 12, 2002

(30) Foreign Application Priority Data

Jun. 8, 2001   (JP) .............................. 2001-174135

(51) Int. Cl.
*G06F 9/445* (2006.01)
(52) U.S. Cl. .................. 717/174; 717/175; 717/176
(58) Field of Classification Search ........ 709/203–223; 711/1; 717/172–178, 134, 140; 705/14; 707/102
See application file for complete search history.

(56) References Cited

U.S. PATENT DOCUMENTS

| | | | |
|---|---|---|---|
| 5,978,584 A * | 11/1999 | Nishibata et al. .......... | 717/134 |
| 6,269,481 B1 * | 7/2001 | Perlman et al. ............. | 717/178 |
| 6,519,767 B1 * | 2/2003 | Carter et al. ................ | 717/140 |
| 6,578,199 B1 * | 6/2003 | Tsou et al. .................. | 717/178 |
| 6,606,744 B1 * | 8/2003 | Mikurak ...................... | 717/174 |
| 2002/0066094 A1 * | 5/2002 | Futakuchi .................... | 717/172 |
| 2002/0095543 A1 * | 7/2002 | Shioda et al. ................ | 711/1 |
| 2002/0161833 A1 * | 10/2002 | Niven et al. ................. | 709/203 |
| 2003/0023703 A1 * | 1/2003 | Hayward et al. ........... | 709/217 |
| 2003/0078998 A1 * | 4/2003 | Lacome D'Estalenx .... | 709/220 |
| 2003/0233278 A1 * | 12/2003 | Marshall ...................... | 705/14 |
| 2004/0031030 A1 * | 2/2004 | Kidder et al. ............... | 717/172 |
| 2004/0059747 A1 * | 3/2004 | Olarig et al. ............... | 707/102 |
| 2005/0044191 A1 * | 2/2005 | Kamada et al. ............. | 709/223 |

FOREIGN PATENT DOCUMENTS

JP   07-219763   8/1995

* cited by examiner

*Primary Examiner*—Meng-Al T. An
*Assistant Examiner*—Mark P. Francis
(74) *Attorney, Agent, or Firm*—Birch, Stewart, Kolasch & Birch, LLP

(57) ABSTRACT

Software for operating a digital camera is installed in a personal computer. The software takes out a serial number of the digital camera, which is connected to the personal computer, when firstly booted. The serial number is sent to a server via the internet. The server checks the received serial number against ledger data. When the received serial number is not registered, this serial number is recorded in the ledger data. The server charges a dealer a royalty of the software in accordance with a user number counted every predetermined period. The dealer requests a monetary facility to transfer the royalty of the software to an account of a right holder of the software.

21 Claims, 8 Drawing Sheets

| SERIAL No. | RECEPTION DATE | REQUEST STATE |
|---|---|---|
| 123-4567 | 2001/06/01 | NON-REQUESTED |
| 123-4568 | 2001/04/15 | REQUESTED |
| 123-4569 | 2001/06/03 | NON-REQUESTED |
| 123-4570 | 2001/03/02 | REQUESTED |

COUNT SYSTEM FOR A NUMBER OF PERIPHERAL DEVICES AND FOR A USER-NUMBER OF SOFTWARE, AND ROYALTY SETTLING SYSTEM

BACKGROUND OF THE INVENTION

1. Field of the Invention

The present invention relates to a count system for counting a number of peripheral devices connected to a personal computer and for counting a user-number of software installed in the personal computer, further, the present invention relates to a royalty settling system for settling a royalty in accordance with the counted number.

2. Description of the Related Art

A digital camera and so forth are connected to a personal computer as a peripheral device to which application software (hereinafter called as software) pertains to be used for the peripheral device. This kind of the software is not always produced by a manufacturer of the peripheral device. Some of the software are supplied from a personal software developer and a software developing company.

A manufacturer of the peripheral device pays a royalty to a right holder of the software when receiving the software from the outside thereof. Payment ways of the royalty are different dependently on contractual matter. For example, a sum is paid in accordance with a number of the sold peripheral devices, and the royalty is paid in accordance with a number of the software for which user registration is completed.

In the case that the royalty is paid in accordance with the sold number, a number of products existing in distribution is also counted so that the royalty is likely to be overly paid rather than the actual sold number. Moreover, not all users having purchased the peripheral device use the software pertaining thereto. Hence, the manufacturer of the peripheral device loses on a profit.

In the system that the royalty is paid in accordance with the number of the software for which the user registration is completed, it takes time for the user to perform the procedure of the user registration. Further, some users use the software without the user registration so that the right holder loses on a profit.

In order to solve the above problems, it is proposed in Japanese Patent Laid-Open Publication No. 7-219763 that a number of users is counted when the software is booted, by utilizing an identification number of a personal computer in which the software is installed. However, when the sole user operates a plurality of personal computers, the user registration is performed plural times so that it is impossible to correctly count the number of users.

SUMMARY OF THE INVENTION

In view of the foregoing, it is a primary object of the present invention to provide a count system for correctly counting a number of peripheral devices.

It is a second object of the present invention to provide a count system for correctly counting a user-number of software installed in a personal computer.

It is a third object of the present invention to provide a royalty settling system for smoothly settling a loyalty in accordance with a number of peripheral devices and a user-number of software installed in a personal computer.

In order to achieve the above and other objects, the count system according the present invention comprises software installed in the personal computer connected to the peripheral device. When the software is booted, a serial number of the peripheral device is taken out therefrom and is sent via the internet connected to the personal computer. The sent serial number is received by a server connected to the internet. The server checks the received serial number with the registered serial numbers. When the received serial number is not registered, the server registers this number in ledger data to increase the counted number.

It is preferable that the serial number is prevented from being doubly sent. However, the serial number may be sent whenever the peripheral device is connected to the personal computer or whenever the software installed in the personal computer is used. Alternatively, a usage number of the peripheral device or the software may be counted, and the serial number may be sent every predetermined usage number. Further, the serial number may be sent only when the usage number has reached a specific number.

In a case that a server owned by a right holder of the software is used as the above-mentioned server, the server is preferable to have a function that a bill of a royalty is issued for a dealer of the peripheral device in accordance with the counted number.

In a case that a server of the dealer is used as the foregoing server, the server is preferable to have a function that the counted number is notified to the right holder, and a royalty sum is automatically transferred to an account of the right holder registered in advance.

In a case that a server owned by a provider of the internet is used as the foregoing server, the counted number is notified to both of the right holder and the dealer of the peripheral device.

According to the count system of the present invention, the serial number of the peripheral device is automatically registered by the software installed in the personal computer so that the number of the peripheral devices and the user-number of the software can be correctly counted. Moreover, the serial number is prevented from being doubly registered and from being mistakenly registered due to server stoppage. Thus, the number of the peripheral devices and the user-number of the software may be correctly known.

Further, by changing the timing for sending the serial number, it is possible to judge whether the software is always used or not.

Furthermore, the royalty is paid relative to the number of the actually used software so that the transfer of the royalty is correctly performed. Meanwhile, in association with the counted number, the royalty is automatically charged and transferred. Also, the receipt of the royalty is automatically issued. Thus, the royalty settling process is prevented from becoming a complicated process so that the cost required for this process may be reduced.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
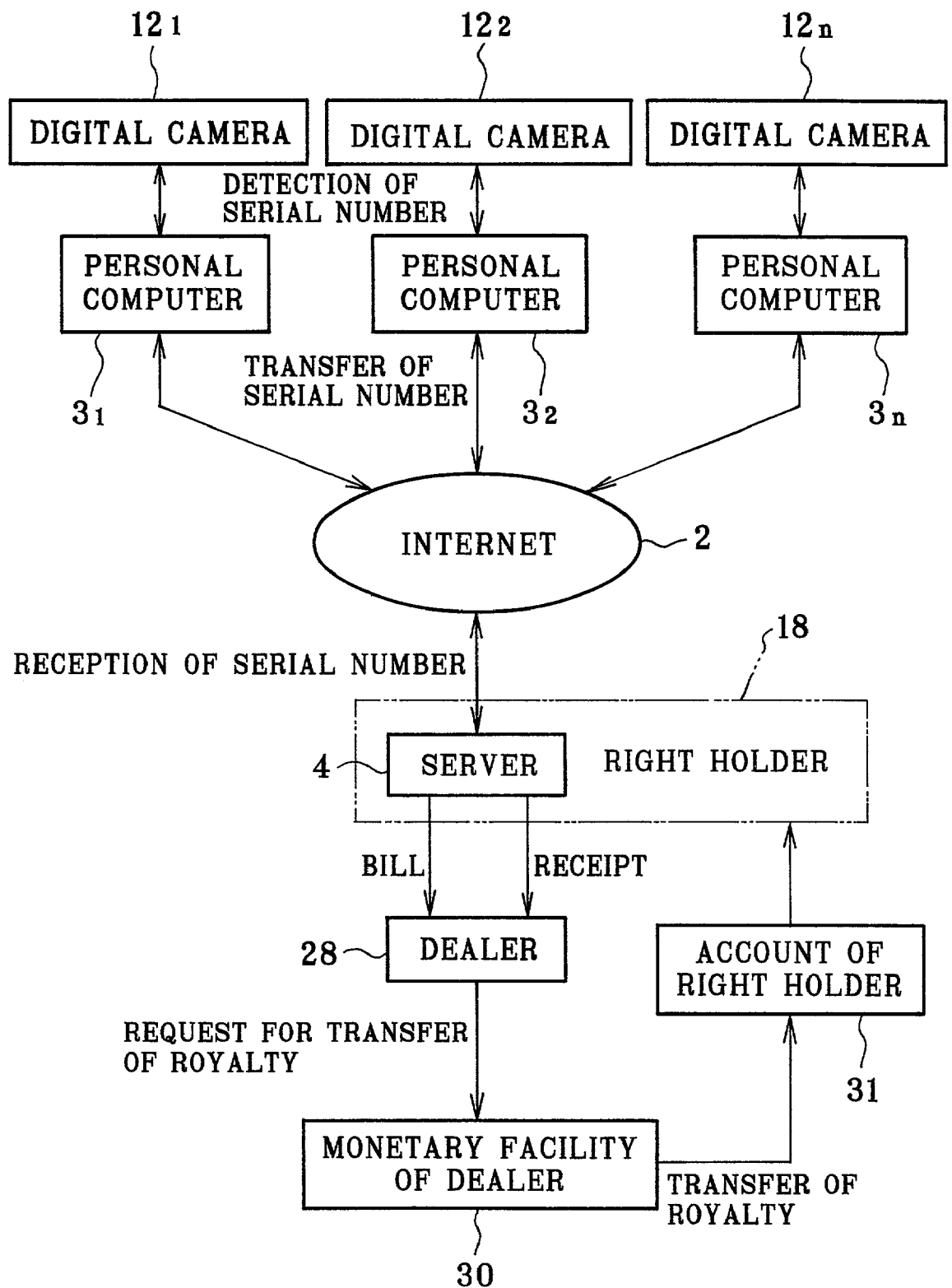
FIG. 1 is a block diagram showing a structure of a count system and a royalty settling system according to the present invention.

FIG. 1 is a block diagram schematically showing a count system and a royalty settling system according to the present invention. These systems are constituted of the internet 2, personal computers $3_1$ to $3n$ connected to the internet 2, and a server 4.

Figure 2:
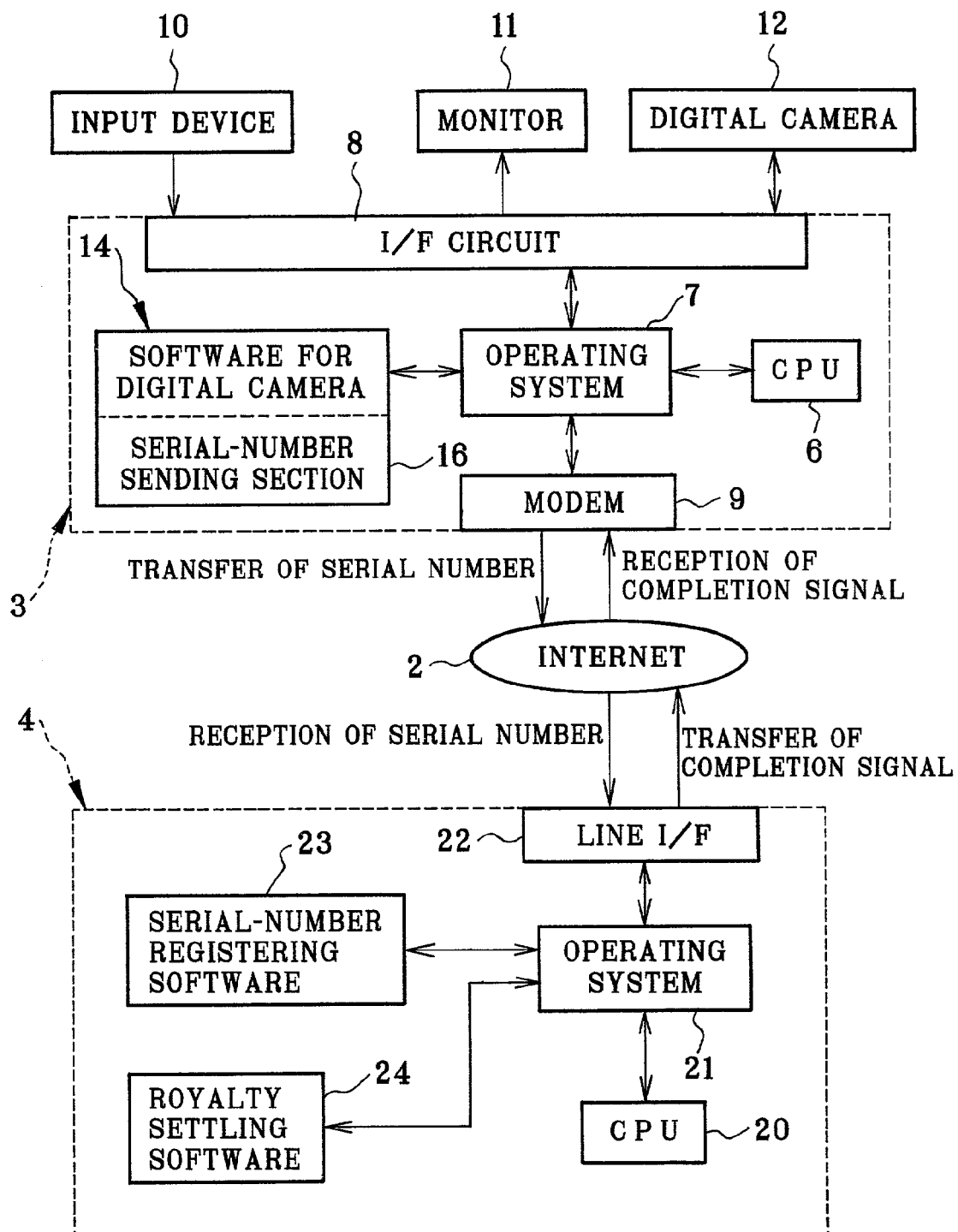
FIG. 2 is a block diagram showing a structure of a personal computer and a server.

As shown in FIG. 2, the personal computer 3 comprises a CPU 6, an operating system 7 operated by the CPU 6, an I/F circuit 8 controlled by the operating system 7 and connected to various devices, and a modem 9 for connecting to a wide-area network of the internet and so forth by utilizing a telephone line. The I/F circuit 8 is connected to an input device 10, a monitor 11, a digital camera 12, and so forth. The input device 10 includes a keyboard and a mouse used for operating the personal computer 3. The monitor 11 displays a picture for operating the personal computer 3. The digital camera 12 is used by connecting with the personal computer 3.

The digital camera 12 is sold as one of peripheral devices of the personal computers 3. A package of the digital camera 12 includes software besides the digital camera itself. The software is installed in the personal computer 3 and is used in cooperation with the digital camera 12. The software 14 pertaining to the digital camera 12 is supplied from a software maker to a dealer being as a manufacturer of the digital camera 12. In accordance with a user number of the pertaining software, a royalty is paid from the dealer to a right holder of the software. By the way, the software is not exclusive to that pertaining to the peripheral device. The software may be separately sold from the peripheral device. Moreover, the software may be downloaded via a network.

Figure 3:
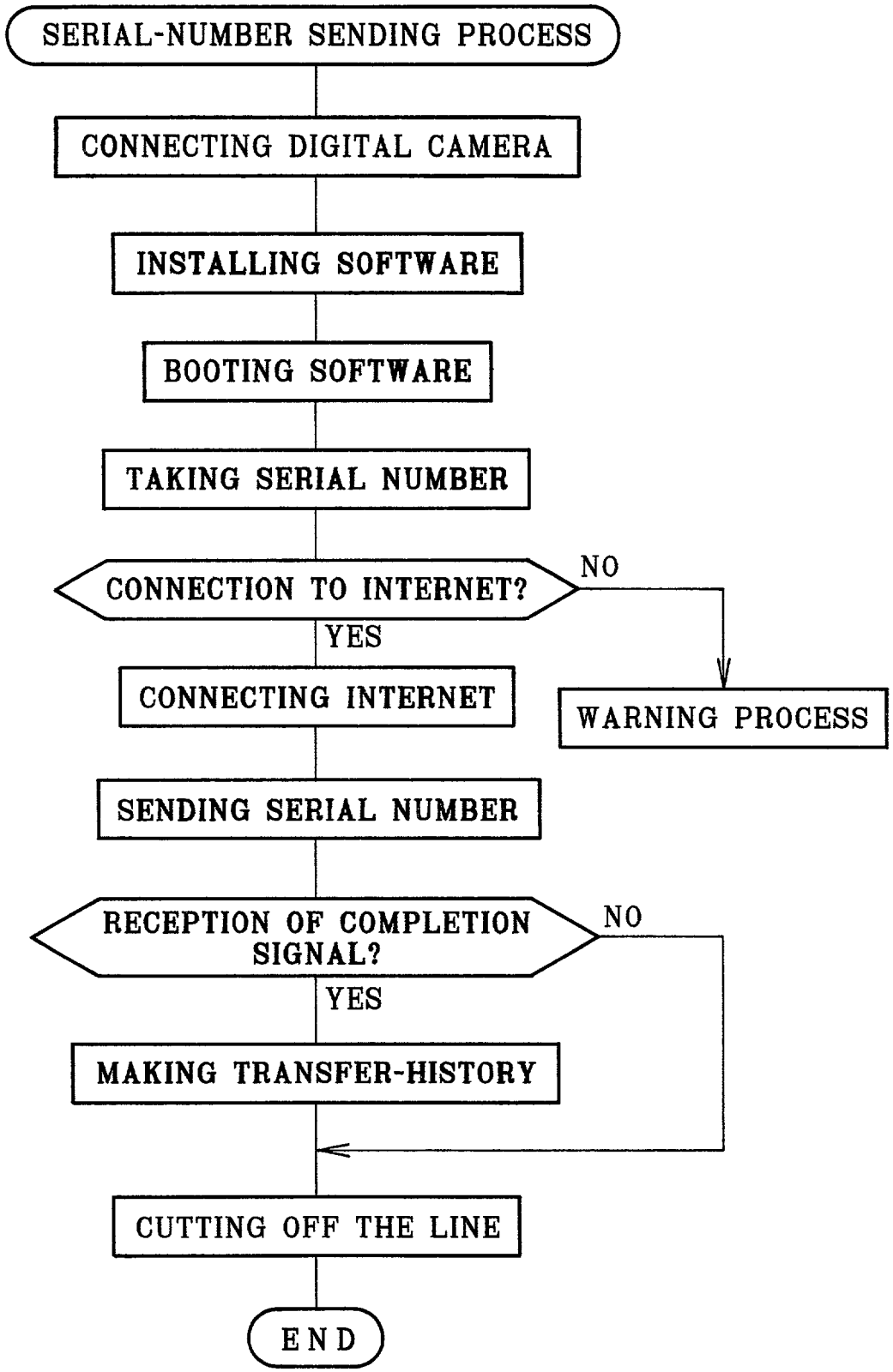
FIG. 3 is a flow chart showing a process for sending a serial number.

The software 14 pertaining to the digital camera 12 includes a serial-number sending section 16 to be operated in the background of the software. As shown in FIG. 3, the serial-number sending section 16 is installed in the personal computer 3 together with the software 14 pertaining to the digital camera 12. When the software 14 is booted, the digital camera 12 is accessed via the operating system 7 and the I/F circuit 8 to obtain a serial number, which is stored in an EEPROM of the digital camera for example.

The serial-number sending section 16 having obtained the serial number of the digital camera 12 activates the modem 9 via the operating system 7 to connect the personal computer 3 to the internet 2 via the telephone line. Upon connecting the personal computer 3 to the internet, the serial-number sending section 16 transmits the obtained serial number to the server 4, which is assigned in advance. A sending process of the serial number is automatically executed without asking a user about the execution of the sending process.

When the transmitted serial number is received by the server 4, a completion signal is sent from the server 4 to the personal computer 3. Upon receiving the completion signal, the serial-number sending section 16 makes data of transmission history and saves this data. After that, the connection to the internet 2 is cut off.

When the software 14 is booted from the next time downward, the transmission-history data is confirmed. When the transmission-history data exists, connection to the internet is not carried out. In the meantime, when the server 4 is stopped and the serial number of the digital camera 12 is not received thereby, the completion signal is not sent to the personal computer 3. In this case, the transmission-history data is not made. Thus, when the software 14 is booted next, the serial number is transmitted to the server again.

When the personal computer 3 does not have a function for connecting to the internet 2, the serial-number sending section 16 executes a warning process for the user. As to the warning process, a message is displayed on the monitor 11 to suggest that environment of the personal computer 3 should be arranged so as to be capable of connecting to the internet. Alternatively, another message is displayed on the monitor 11 to suggest that the user registration should be completed by mail or facsimile.

The server 4 is managed by the right holder 18 of the software 14 used for the digital camera 14. The server 4 has a similar structure to the personal computer 3, and comprises a CPU 20, a server operating system 21 operated by the CPU 20, and a line I/F 22 for connecting to the wide-area network of the internet 2 and so forth. In the server 4, are installed serial-number registering software 23 and royalty settling software 24.

Figures 4, 5:
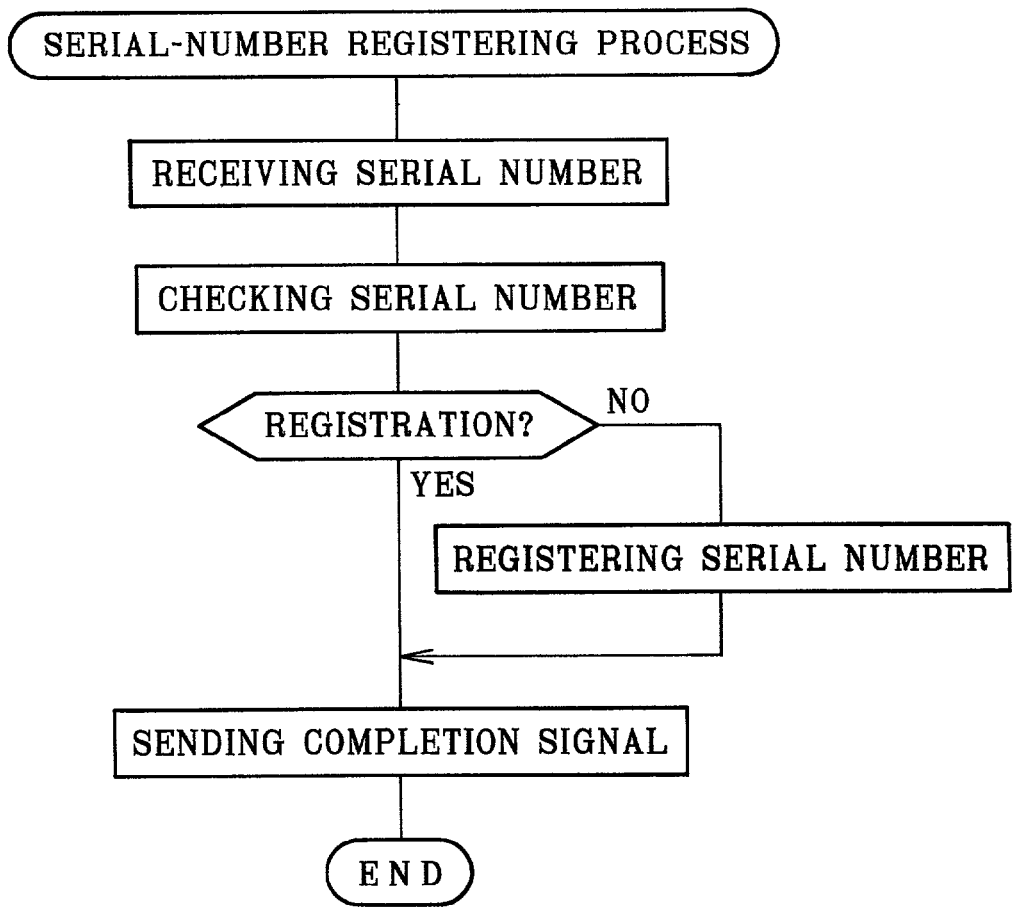
FIG. 4 is an explanatory illustration showing an example of ledger data of the serial numbers.
FIG. 5 is a flow chart showing a process for registering the serial number.

The serial-number registering software 23 makes ledger data 26 in which the registered serial numbers are entered such as shown in FIG. 4. The ledger data 26 includes a reception date, request of the royalty, and so forth, which are recorded so as to correspond to the serial number.

When the serial number is received from the personal computer 3 via the line I/F 22, the serial-number registering software 23 checks the ledger data 26 to confirm whether the received serial number is registered or not, such as shown in FIG. 5. When the received serial number is not registered, this serial number is newly recorded in the ledger data 26 together with the data pertaining thereto. After revising the ledger data 26, the completion signal is sent to the personal computer 3. Meanwhile, when the received serial number is registered, the completion signal is sent to the personal computer 3 without registering the serial number.

In this way, the received serial number is always checked against the ledger data 26. Thus, the serial number is prevented from being doubly registered, even if the sole user installs the software in a plurality of the personal computers. Consequently, the royalty sum of the software is not affected.

Figure 6:
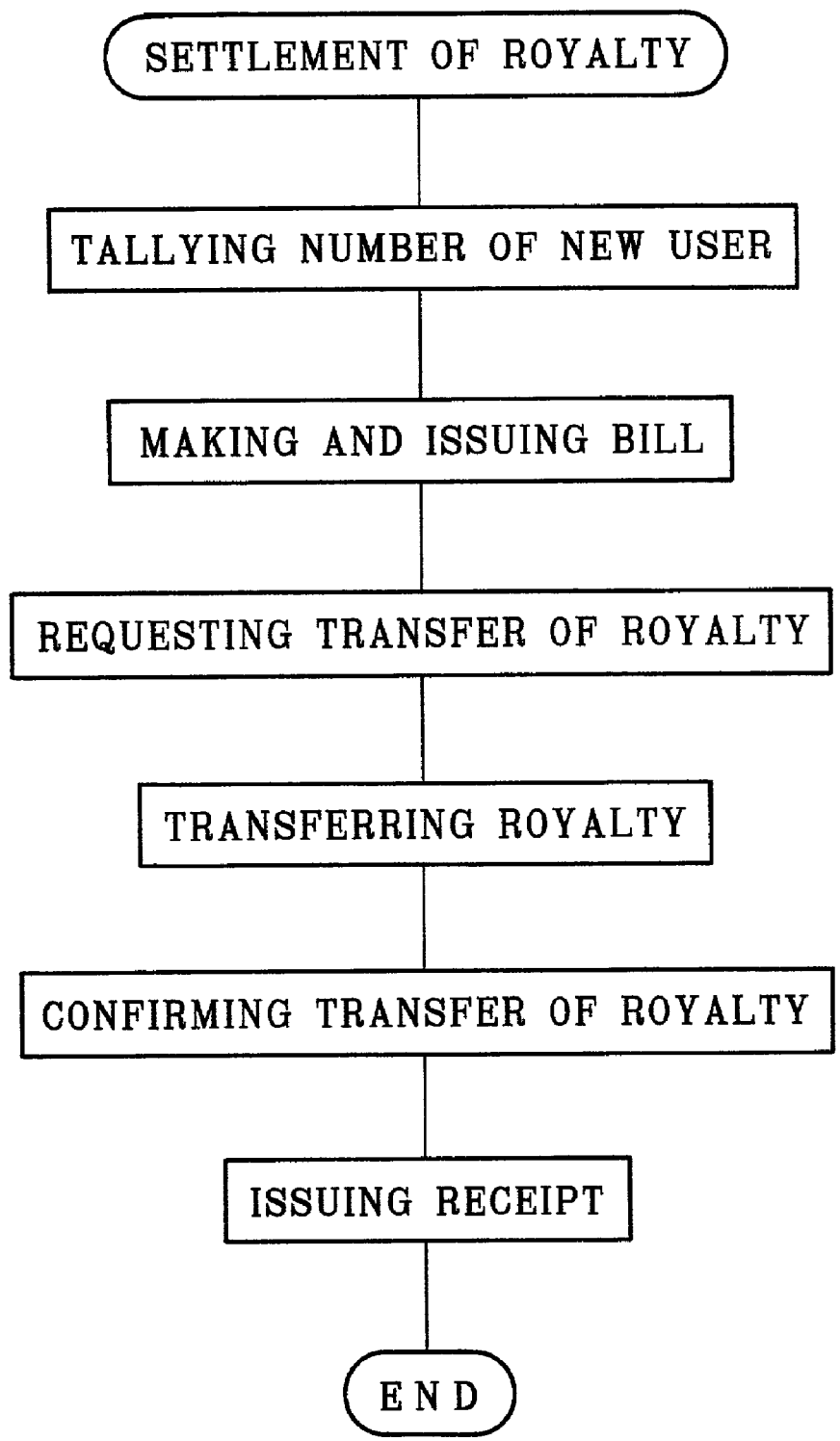
FIG. 6 is a flow chart showing a process for settling a loyalty.

As shown in FIG. 6, the royalty settling software 24 automatically counts a number of users for whom the royalty is not yet settled, every predetermined period, for instance every month. Successively, the royalty settling software 24 makes a bill in which the royalty sum is entered. The bill is sent to a server managed by the dealer 28 of the digital camera, by utilizing the internet 2, a private line, and so forth.

Upon receiving the bill sent from the right holder 18, the server of the dealer 28 automatically requests a monetary facility 30, by utilizing the internet 2, a private line, and so forth, to transfer the royalty sum. The requested monetary facility 30 transfers the royalty sum to a bank account of the right holder 18, which is enrolled in advance.

A monetary facility used by the right holder 18 notifies the server 4 of the right holder 18 that the royalty sum has been transferred. In response to this notification, the royalty settling software 24 of the server 4 automatically issues a receipt to the server of the dealer 28. Further, the ledger data 26 is revised such that a portion represented as "non-requested" is changed so as to be represented as "requested".

As described above, the serial number is not doubly registered and an error of registration is not caused due to a halt of the server. Thus, it is possible to obtain a correct number of users. Moreover, the user registration is automatically completed so that the time for performing the registration by mailing or the like is omitted.

The royalty occurs relative to a number of users actually using the software so that the royalty may be fairly settled. Further, in relation to the count of the user number, it is automatically performed to charge the royalty and to transfer it. Also, it is automatically performed to issue the receipt. Thus, it is possible to prevent the royalty settling process from becoming a complicated process, and it is possible to reduce the cost required for this process.

In the above embodiment, the serial number is sent when the software 14 is initially booted and until the registration is completed. However, the serial number may be sent whenever the software 14 is booted. Alternatively, the serial number may be sent whenever the software 14 is used predetermined times, for example, ten times. In doing so, it is possible to know a usage frequency of the software 14.

The serial number may be sent when the software 14 is used prescribed times over, for example, twenty times over. In doing so, users merely trying the software 14 a few times are distinguished from the other users frequently using the software 14. It is possible to obtain a similar effect in comparison with a case in that a trial of prescribed times is applied to the software 14.

Figure 7:
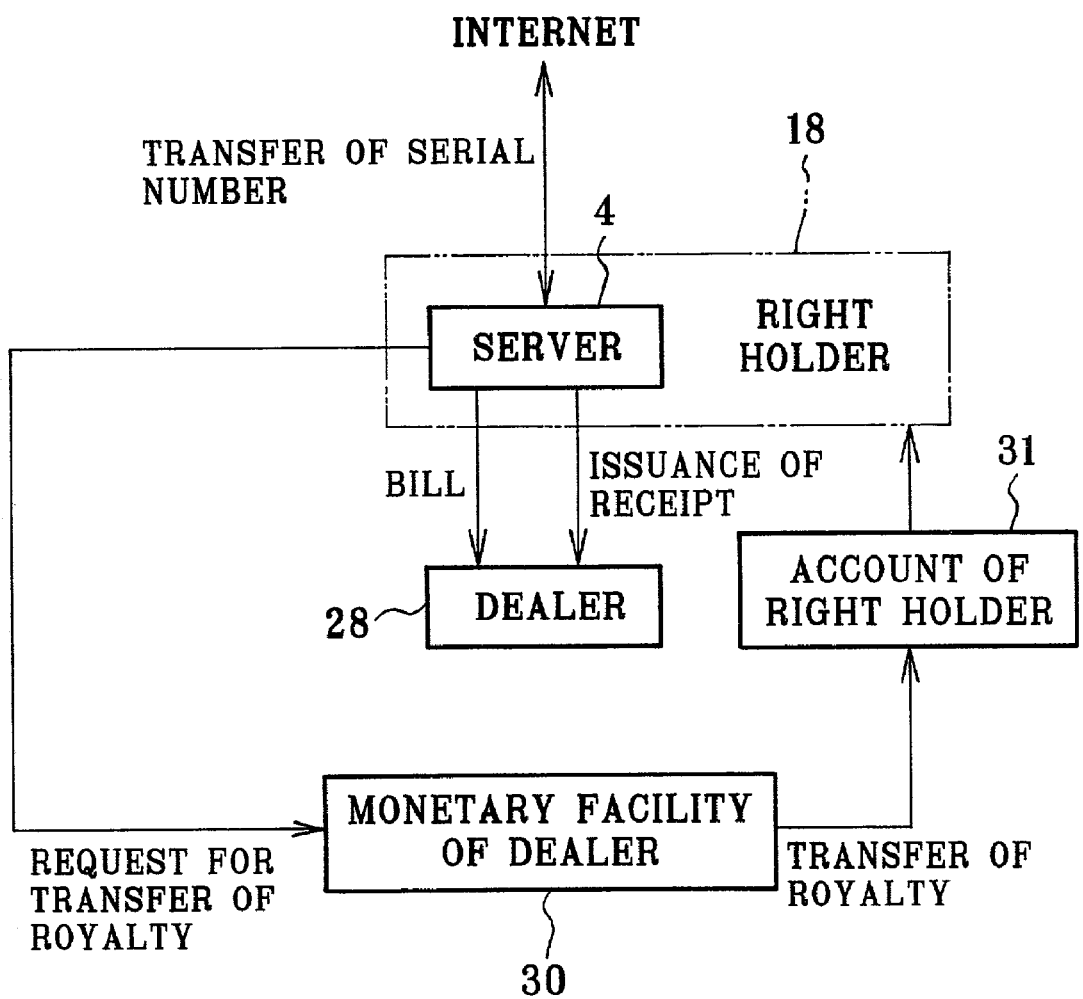
FIG. 7 is a block diagram showing a structure of the royalty settling system in a case that transfer of the royalty is requested by a right holder of software.

In the above embodiment, the dealer 28 transfers the royalty to the account of the right holder 18 in response to the bill issued from the right holder 18. However, as shown in FIG. 7, the right holder 18 may request the monetary facility to transfer the royalty from the account of the dealer 28 to the account of the right holder 18 at the same time of issuance of the bill. In this case, it is possible to reduce a load of process taken in the server of the dealer 28 so that the royalty may be more quickly settled.

Figure 8:
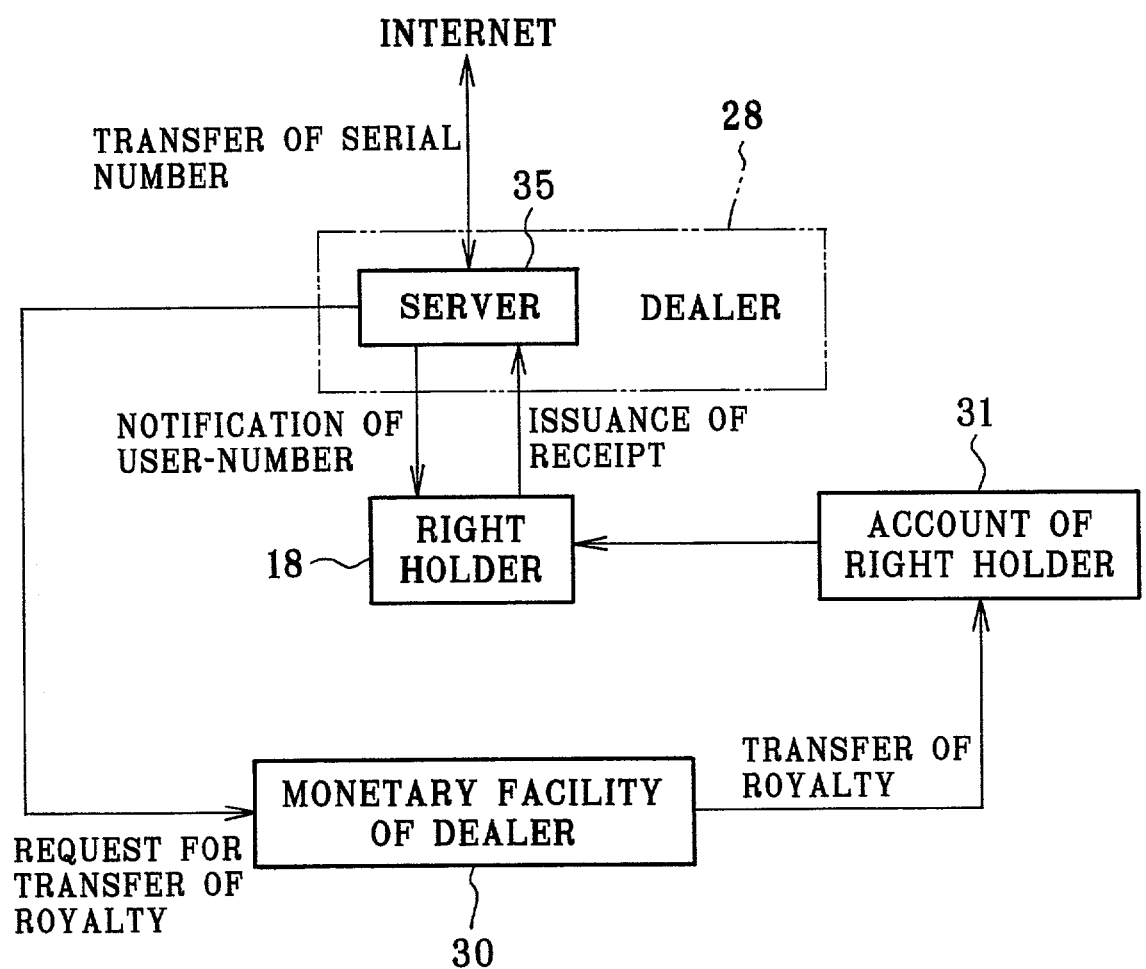
FIG. 8 is a block diagram showing a structure of the royalty settling system in a case that a dealer of a peripheral device registers the serial number and settles the royalty.

As shown in FIG. 8, the server 35 of the dealer 28 may execute the serial-number registering process and the royalty settling process. In this case, the user number is notified from the server 35 to the right holder 18, and at the same time, the royalty is transferred to the account 31 of the right holder 18. Incidentally, transferring the royalty may be performed after charging the dealer 28 the royalty.

Figure 9:
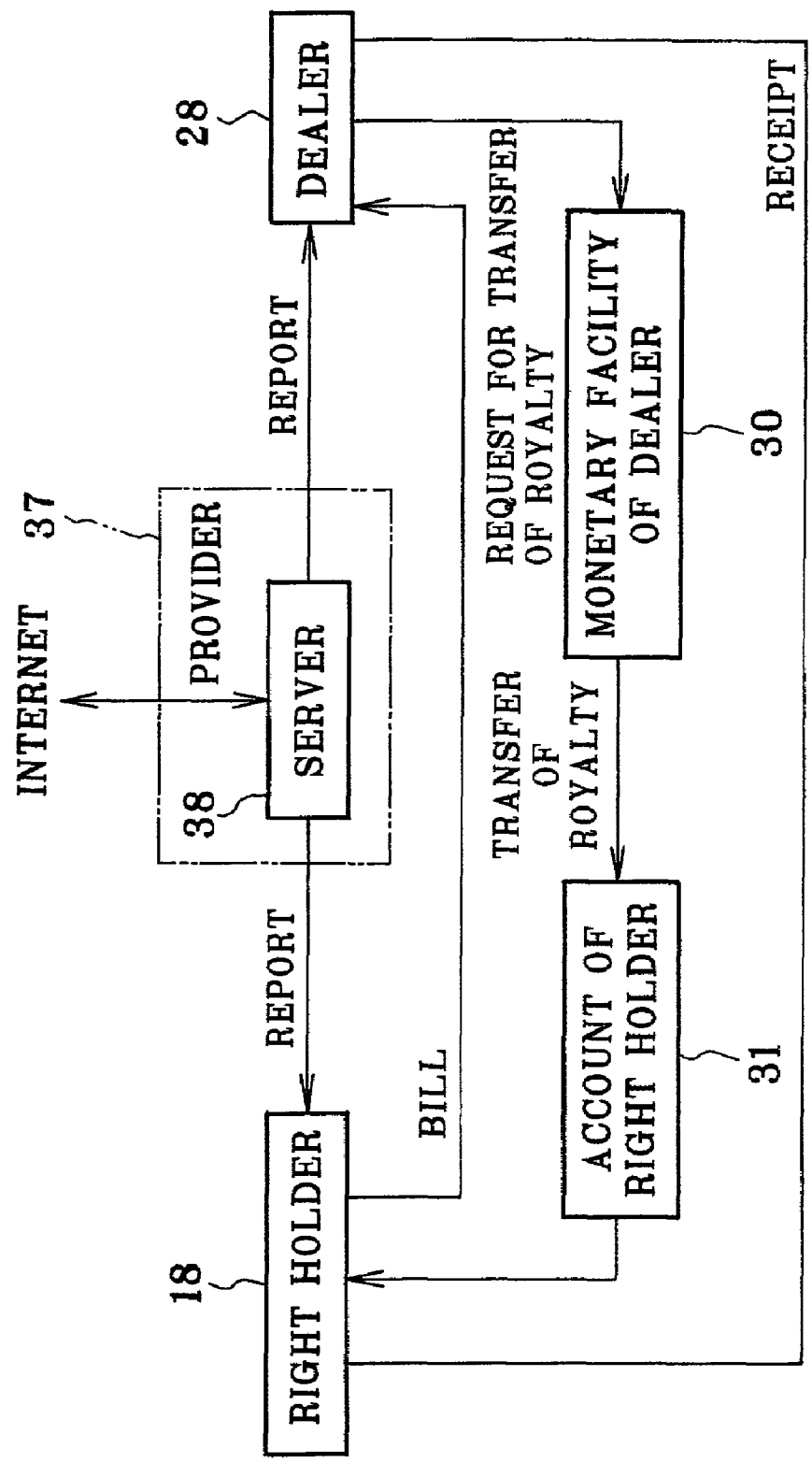
FIG. 9 is a block diagram showing a structure of the royalty settling system in a case that the serial number is registered by a server of a provider.

As shown in FIG. 9, the serial-number registering process may be executed by utilizing a server 38 of a provider 37. In this case, the user number is notified from the server 38 to both of the dealer 28 and the right holder 18. Successively, the right holder 18 charges the dealer 28, and the royalty is transferred from the dealer 28 to the right holder 18. After that, the receipt is issued from the right holder 18 to the dealer 28. In this way, the transfer of the royalty is completed.

In the above embodiment, the serial number is sent without confirmation for the user. The serial number, however, may be sent after confirmation for the user. Moreover, although the user number of the software is counted, it is possible to count a user number of the peripheral device itself, which is the digital camera for instance.

As to the date to be sent, the serial number is not limited. It is possible to send the serial number together with data including a kind of another peripheral device to be used, a kind of the software, a version of a used operating system, and so forth. If it is possible to collect and send an address, a name, a mail address, and so forth of the user, these items may be utilized for aftercare.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A count system for counting one of a number of a plurality of peripheral devices and a user-number of application software associated with said peripheral devices, at least one of said peripheral devices being connected to a personal computer and at least one of said application software being installed in said personal computer, said count system comprising:

serial-number sending means incorporated in each said application software, said serial-number sending means taking a serial number of said respective associated peripheral device and transferring said serial number via the internet connected to said personal computer;

a server connected to the internet; and registration software installed in said server, said registration software receiving the transferred serial number to check this number with registered serial numbers, and said registration software registering the transferred serial number and incrementing one of a count of the number of said peripheral devices having an associated installed application software and the user-number count of said application software, wherein said serial-number sending means transfers said serial number whenever said peripheral device having said serial number is connected to said respective personal computer, wherein a plurality of right holders distribute respective kinds of application software, said server relates said count with an identifier of a right holder of a respective kind of application software and maintains said count-identifier relationship, wherein said plurality of right holders are different software developing companies.

2. A count system according to claim 1, wherein said serial-number sending means transfers said serial number without confirmation for the user.

3. A count system according to claim 1, wherein said serial-number sending means executes a warning process suggesting either of connection to the internet and user registration by a mail, when said personal computer is incapable of connecting to the internet.

4. A count system according to claim 1, wherein said serial-number sending means saves a transmission-history of said serial number and is prevented from doubly registering said serial number.

5. A count system according to claim 1, wherein said serial number sending means transfers said serial number whenever said respective associated application software is booted.

6. A count system according to claim 1, where in incrementing said one of a count of a usage number of said peripheral devices and a user-number count of said associated application software, said serial-number sending means transferring said serial number of one of said plurality of peripheral devices every predetermined count N (N is an integer greater than zero) that said respective associated application software for the one peripheral device is booted.

7. A count system according to claim 1, where in incrementing one of said count of a usage number of said peripheral devices and a user-number count of said associated application software, said serial-number sending means transferring said serial number upon reaching a predetermined number N (N is an integer greater than zero) that the respective associated application software for the one of said peripheral devices has been booted.

8. A count system according to claim 1, wherein said server further calculates a royalty in accordance with one of the count of the number of said peripheral devices and said user-number count.

9. A count system according to claim 1, wherein said server relates said count with an identifier for a right holder of said application software and maintains said count-identifier relationship.

10. A count system according to claim 9, wherein said right holder is a software developing company.

11. A royalty settling system for settling a royalty in accordance with a user-number count of application software associated with a plurality of peripheral devices, one or more of which are connected to a respective personal computer, at least one said application software being installed in said respective personal computer, said royalty settling system comprising:
    serial-number sending means incorporated in each said application software, said serial-number sending means taking a serial number of said respective associated peripheral device and transferring said serial number via the internet connected to said personal computer;
    a server connected to the internet; and
    registration software installed in said server, said registration software receiving the transferred serial number to check this number with registered serial numbers, and said registration software registering the transferred serial number and incrementing said user-number count of said application software,
    wherein said serial-number sending means transfers said serial number whenever said peripheral device having said serial number is connected to said respective personal computer,
    wherein a plurality of right holders distribute respective kinds of application software, said server relates said count with an identifier of a right holder of a respective kind of application software and maintains said count-identifier relationship,
    wherein said plurality of right holders are different software developing companies.

12. A royalty settling system according to claim 11, wherein said server is set up at a side of a right holder of said application software, said server having a function that a bill of said royalty is automatically issued to a dealer of said peripheral device.

13. A royalty settling system according to claim 12, wherein said server transfers a sum corresponding to the royalty of said user-number count, from an account of a monetary facility of said dealer, said server notifying said dealer about the transfer of the sum.

14. A royalty settling system according to claim 11, wherein said server is set up at a side of a dealer of said peripheral device, said server having a function that said user-number count is automatically notified to a right holder of said application software.

15. A royalty settling system according to claim 14, wherein said server automatically transfers a sum corresponding to the royalty of said user-number, from an account of a monetary facility of said dealer to an account of a monetary facility of said right holder.

16. A royalty settling system according to claim 11, wherein said server is owned by a provider of the internet, said server having a function that said user-number count is automatically notified to both of a dealer of said peripheral device and a right holder of said application software.

17. A royalty settling system according to claim 16, wherein said right holder charges a sum corresponding to the royalty of said user-number count for said dealer, and said dealer transfers said sum to said right holder.

18. A royalty settling system according to claim 11, wherein said server relates said count with an identifier of a right holder of said application software and maintains the count-identifier relationship, and initiates a payment process for payment of royalty to said right holder based on said user-number count of said application software and the identifier of the right holder.

19. A royalty settling system according to claim 18, wherein said right holder is a software developing company.

20. A royalty settling system according to claim 11, wherein a plurality of right holders distribute respective kinds of application software, said server relates said count with an identifier for a right holder of a respective kind of application software, and initiates a payment process for payment of royalty to each said right holder based on said user-number count of said respective kind of application software and said identifier of the right holder.

21. A royalty settling system according to claim 20, wherein said plurality of right holders are different software developing companies.

* * * * *